United States Patent [19]
Dodd et al.

[11] Patent Number: 4,941,393
[45] Date of Patent: Jul. 17, 1990

[54] LOADING APPARATUS FOR AMMUNITION

[75] Inventors: Richard E. Dodd, Santa Ana; William C. Baldwin, Costa Mesa, both of Calif.

[73] Assignee: North American Dynamics, Tustin, Calif.

[21] Appl. No.: 405,338

[22] Filed: Sep. 11, 1989

[51] Int. Cl.5 .............................. F42B 39/08
[52] U.S. Cl. .................. 89/35.01; 89/33.14
[58] Field of Search ............ 89/33.14, 33.16, 33.2, 89/33.25, 34, 35.01, 35.02; 221/77, 84, 85; 198/731

[56] References Cited

U.S. PATENT DOCUMENTS

| 750,883 | 2/1904 | McCasland | 221/77 |
|---|---|---|---|
| 1,288,261 | 12/1918 | Stimpson | 89/35.01 |
| 1,288,262 | 12/1918 | Stimpson | 89/35.01 |
| 2,263,075 | 11/1941 | Elvers | 221/77 |
| 2,379,112 | 6/1945 | Stewart | 221/77 |
| 2,437,425 | 3/1948 | Goodhue et al. | 221/77 |
| 2,489,428 | 11/1949 | Mariner | |
| 2,546,823 | 3/1951 | Holloway | |
| 2,809,562 | 10/1957 | Herlach | |
| 2,915,945 | 12/1959 | Linke et al. | 89/33.16 |
| 2,954,864 | 10/1960 | Lee et al. | 198/731 |
| 3,139,174 | 6/1974 | Genter | 198/731 |
| 3,169,445 | 2/1965 | Stanton et al. | |
| 3,687,003 | 8/1972 | Zurbuchen et al. | 89/33.16 |
| 3,841,510 | 10/1974 | Walton et al. | 198/731 |
| 4,004,491 | 1/1977 | Seeling | 89/35.01 |
| 4,137,821 | 2/1979 | Benedict | 89/35.01 |
| 4,429,615 | 2/1984 | Morris | |
| 4,781,100 | 11/1988 | Baldwin | 89/33.04 |
| 4,882,972 | 11/1989 | Raymond | 89/34 |

FOREIGN PATENT DOCUMENTS

| 718743 | 9/1965 | Canada | 221/85 |
|---|---|---|---|
| 315256 | 11/1919 | Fed. Rep. of Germany | 89/35.01 |
| 355767 | 2/1930 | United Kingdom | 89/33.14 |

Primary Examiner—Charles T. Jordan
Assistant Examiner—Stephen Johnson
Attorney, Agent, or Firm—Price, Gess & Ubell

[57] ABSTRACT

An ammunition transport system employing a container wherein an endless wire rope ladder chain is mounted to move in serpentine fashion, the ladder chain including transport tubes disposed as the ladder "steps," which serve to move ammunition through the container. The ladder chain includes successive ladder segments joined together by mounting respective swaged end fittings in special connector tubes. The transport tubes snap onto steel balls disposed along the ladder, while the connector tubes are positively retained by pop-on retainers.

12 Claims, 3 Drawing Sheets

LOADING APPARATUS FOR AMMUNITION

This invention was made with Government support under Contract No. FO8635-89-0229. The Government has certain rights in this invention.

BACKGROUND OF THE INVENTION

1. Field of the Invention

The subject invention relates to ammunition transport systems for loading and feeding ammunition. More particularly, the invention relates to apparatus for providing a simple lightweight ammunition transport system capable of uploading and downloading ammunition into and from a gun system, ensuring proper orientation of the rounds, protecting ammunition from handling hazards, and functioning under a wide range of environmental conditions.

2. Description of Related Art

The ammunition loading system impacts logistics and supportability from the LAP (load, assemble and pack) facility to the flight line. Ammunition represents virtually all of the gun system weight and volume that will be transported and handled worldwide during the system's life and, accordingly, places great demands on manpower. Even in peacetime, the requirement to demonstrate combat capability of each combat unit at least quarterly causes hundreds of thousands of rounds to be recycled through storage areas every year.

The cumbersome clothing used to protect personnel from chilling arctic weather or chemical and biological pollutants makes the operation of loading systems even more difficult. In many cases, the loading task occurs in cramped quarters with poor visibility and often in conditions that make even fair weather operation difficult.

A wide variety of technologies, loading concepts, and ammunition containers are in use with today's small and medium caliber aircraft gun systems. The level of integration of the LAP package in the overall system is an important discriminator between the various concepts. For most systems the utility of the LAP package ends at the storage area, while with others, specifically the A10 the aircraft is loaded directly from the LAP package at the flight line. Hypothetically, the ultimate integration would incorporate the LAP package directly into the aircraft, becoming an integral part of a modular aircraft feed system.

The current A10 system utilizes the ammunition container packaged at the LAP facility as an integral part of the flight line loader assembly. The 30-mm A10 ammunition is stored in plastic "link tube carriers" that are connected by a fabric rope. Thermal expansion problems at both low and high temperatures have detrimentally affected the system's performance by effecting the extraction of the round from the link tube carriers. This potential problem indicates the desirability of designing a system that is operationally insensitive to the LAP configuration. This can be accomplished by a loading system that is independent of the LAP package, or by a loading system that is carefully designed to remain unaffected by environmental extremes as well as long duration storage.

As indicated above, the majority of today's ammunition loading systems do not use the LAP package on the flight line. These systems can be segregated into two broad categories: linked loaders and linkless loaders.

Although linked ammunition loading systems are predominant today, they are being replaced by linkless technology. Briefly, the procedure required to load 20-mm ammunition with a linked loading system includes temporarily linking the ammunition at the storage facility (if prelinked ammunition is not available). Link belts are then placed in modules that are transported to the flight line, where they are fed through a flex chute to an interface unit that is attached to the aircraft access/transfer unit. The system is typically powered by a pneumatic drive. Rounds are delinked by the interface unit and handed off to the aircraft access/transfer unit. Simultaneously, links, spent brass, and bypassed rounds drop into an open chute and fall into an empty module on the trailer. The rough and uncontrolled handling during the downloading process contributes to the high rejection rate of reprocessed ammunition.

The universal loader (UALS) Part No. 212F156, developed and manufactured by General Electric, will upload/download various aircraft. With this system, based on rotary linkless technology, the loading procedure at the flight line is similar to the linked systems in that the loader interface unit is attached to the aircraft access/transfer unit and powered by an air wrench drive assembly. This system includes an integral pneumatic system.

The major benefit of this loading concept is the absence of links during the loading operation. A well designed mechanism can handle bulk ammunition more reliably than linked ammunition. In addition, downloaded material (again excluding links) is returned in an orderly and controlled fashion to the loader, which minimizes damage to reprocessed ammunition. The UALS concept also facilitates potential automation of the returned munitions inspection and repackaging procedure.

The shape of the 20-mm AGT cased telescoped ammunition versus conventional M-50 series ammunition impacts loading system considerations both beneficially and detrimentally. Beneficially the simplified exterior shape can be defined by a length, a diameter and corner radii. The constant diameter minimizes the number of rotor configurations required and eliminates additional guides to support the smaller bourrelet diameter. Conventional ammunition requires the definition of dozens of features (rotating band, ogive, meplat, bourrelet, extractor groove, case neck, etc.). Each of these features effects the design of the packaging, loading, and feeding systems.

However, the AGT cartridge structure imposes some handling constraints in that it utilizes higher strength material and is inherently stronger in half-inch zones at both ends of the cylindrical cartridge than the center. Therefore, round control should be accomplished by avoiding the center of the case.

The reliability of linear linkless concepts has been proven in the last ten years. Prior to acceptance of the technology, opponents argued that the chain used to transport rounds through the storage container represented the foremost drawback in the system. Many different sizes and styles of chain have been incorporated in linear linkless designs including: 8-mm, 0.25-inch pitch and 0.375-inch pitch.

Although the reliability issue is no longer an obstacle, cost has replaced it; at least in the case of loading systems that utilize the LAP package as part of the loader. It has occurred to the inventors that a significantly cost-reduced system for linkless loading could be produced if the chain ladder transport mechanism could be replaced with a wire rope ladder transport mechanism.

Steel wire rope is a common material utilized in aircraft control systems. The environmental specification (MIL-W-83420-D) defines a usable temperature range from −65° F. to +248° F., and high resistance to dirt, dust, and solvents. Having conceived of the idea of using wire rope in an ammunition loading system, the inventors have recognized a considerable number of obstacles to achieving a successful device. These obstacles include the necessity to successfully:

a. Join wire rope ends to form a continuous loop in the face of considerable loads
b. Attach cross bars to provide round control
c. Sustain high numbers of flex cycles traveling over pulleys
d. Maintain acceptable crossbar pressure angles
e. Install a continuous wire rope ladder in a storage container

SUMMARY OF THE INVENTION

Accordingly, it is an object of the invention to provide improved ammunition transport apparatus.

It is another object of the invention to provide simplified ammunition transport apparatus of reduced weight and cost.

It is another object of the invention to provide an ammunition transport system which is maintainable, supportable, and operative over a wide range of environmental conditions.

It is another object of the invention to provide a simple lightweight ammunition transport system capable of uploading and downloading ammunition into and from a gun system, ensuring proper orientation of the rounds, protecting ammunition from handling hazards, and functioning under a wide range of environmental conditions.

It is another object of the invention to devise a wire rope apparatus for ammunition transport apparatus.

It is yet another object of the invention to implement an ammunition transport system employing a wire rope ladder.

According to the invention, an improved linkless ammunition transport apparatus of reduced weight and cost is provided by employing wire rope to construct an ammunition feed ladder. Means is provided for attaching the wire rope ladder to crossbar apparatus for round control. Means is also provided for joining the wire rope sections together to form a continuous system. The transport apparatus may be used in loading and/or feeding of ammunition.

In a preferred embodiment, interconnection members comprising metal balls are swaged on the wire rope, and crossbars in the form of tubes having ends slotted and adapted to snap-fittingly receive the balls are provided. A snap fit connecting tube is provided to receive hemispherical swaged fittings on either end of respective wire ropes of successive wire rope ladders to form a continuous conveyor loop.

The preferred container design allows installation of the continuous wire rope ladder assembly. It utilizes two composite identical one-piece pultrusion skins interlocked and separated by composite pultrusion panels. Turnaround sprockets are located at the ends of the round guide panels to control and guide the wire rope ladder.

The foregoing summary of advantageous features of the preferred embodiment is provided for introductory purposes only, and is not intended to retrict or limit the scope of the invention, which is set forth in the appended claims, construed according to applicable legal principles.

BRIEF DESCRIPTION OF THE DRAWINGS

The just-summarized invention will now be described in conjunction with the drawings, of which.

DESCRIPTION OF THE PREFERRED EMBODIMENTS

Figure 1:
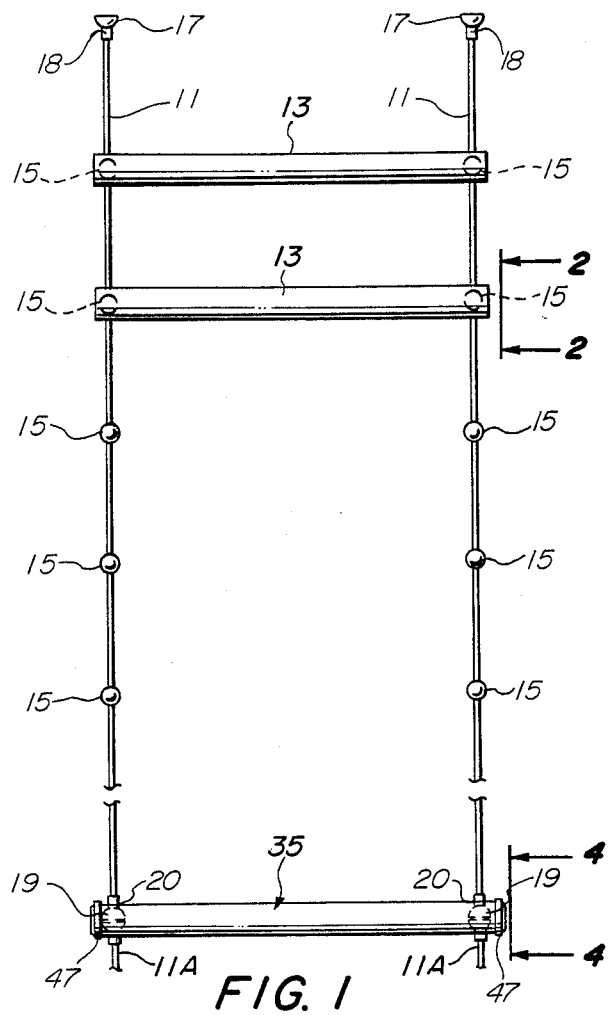
FIG. 1 is a front schematic view of a wire rope ladder according to the preferred embodiment.

The rope ladder ammunition conveyer or transport system according to the preferred embodiment is illustrated in FIG. 1. As shown in FIG. 1, the preferred embodiment includes first and second wire ropes 11 across which are mounted equally spaced tubes 13. The ladder ropes 11 each have a number of equally spaced interconnection members in the form of metal balls 15 mounted thereon, preferably by swaging. The balls 15, which may be steel, snap fit into the tubes 13 to retain the tubes 13 on the wire ropes 11. Since each tube 13 is responsible for conducting only one ammunition round, in the preferred embodiment, the tubes 13 may be formed of plastic. In other embodiments, e.g., for handling larger calibers, it may be preferable to have stainless steel or aluminum tubes 13. As the caliber goes up, the size of the wire rope 11 also goes up. Typical wire rope sizes are 1/16-inch to 3/16-inch in diameter.

Each wire rope 11 has respective end fittings 17, 19 mounted thereon. The end fittings 17, 19 are generally hemispherical in shape. In the preferred embodiment, the fittings 17, 19 are subjected to considerable loads, which necessitates secure attachment of the end fittings 17, 19. Accordingly, each end fitting 17, 19 is provided with a respective shank 18, 20 which is swaged onto the wire rope 11 to firmly attach the fittings 17, 19.

In the preferred embodiment, the end fittings 17, 19 are joined utilizing a connector tube 35. One such connector tube 35 is shown broken away in FIG. 1 and is illustrated in more detail in FIGS. 4-6. Retainer bands 47 are used to positively retain the end fittings 17, 19 within the connector tubes 35. As disclosed in connection with FIG. 1, the preferred structure is to join or "chain" several wire rope ladders, e.g., 11, 11a, together by connector tubes 35 to form a continuous wire ladder conveyor. This permits easier maintenance in case a particular section 11, 11a is damaged.

Figure 2:
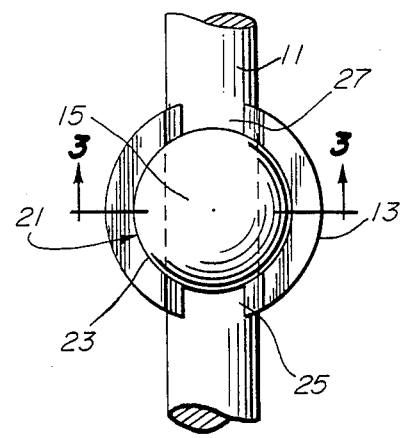
FIG. 2 is an end view of a crossbar tube taken at 2—2 of FIG. 1.

An end view of one of the tubes 13 is shown in FIG. 2. As shown in this end view, the end of the tube 13 contains a cutout 21 including two slots 25, 27, each of which lead to a centrally located, generally spherical recess 23. The recess 23 accommodates one of the steel balls 15, while the slots 25, 27 permit entry of the wire rope 11 in order to pass the wire rope 11 through the end of the tube 13.

Figure 3:
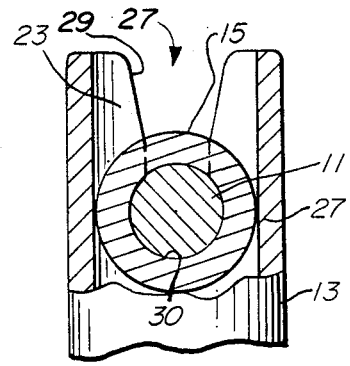
FIG. 3 is a cutaway top sectional view of the crossbar tube taken at 3—3 of FIG. 2.

As shown in FIG. 3, the wall 28 at the end of the tube 13 is spherically contoured to form the generally spherical recess 23. The wall 27 may have a camferred edge 29 leading to the recess 23. The slot 25 is shown as having an end 30 which is semicircular in cross-section. Both ends of each tube 13 are identically structured to receive and hold a steel ball 15.

Figure 4:
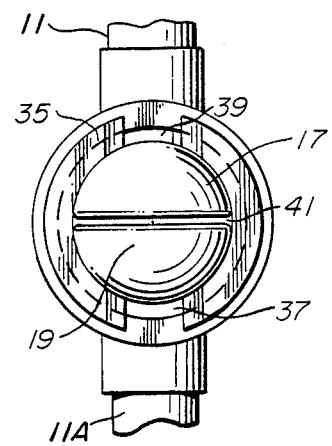
FIG. 4 is an end view of a connector tube according to the preferred embodiment taken at 4—4 of FIG. 1.

FIG. 4 illustrates a connecting tube 35 used to connect opposite ends of successive wire rope ladders, e.g., 11, 11a together to form a continuous wire rope ladder or conveyor. The connecting tube 35 may be generally spherical in shape, having slots 37, 39 leading to a generally spherical, centrally located chamber 41. The swaged end fittings 17, 19 are introduced into this chamber 41.

Figure 5:
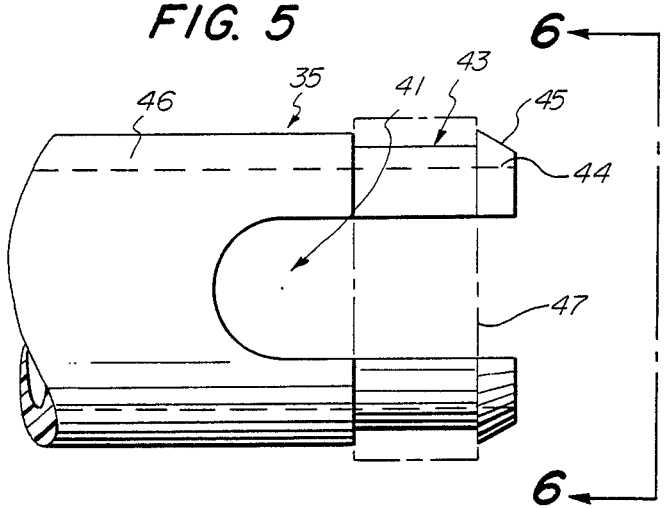
FIG. 5 is a top view of one end of the connector tube of FIG. 4.
Figure 6:
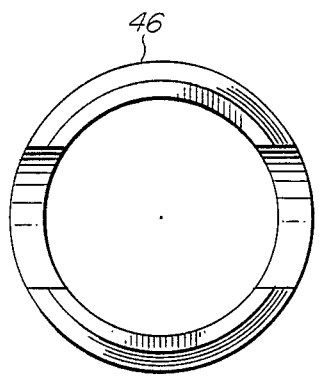
FIG. 6 is a view taken at 6—6 of FIG. 5.

FIGS. 5 and 6 show a top view and end view of the connector tube 35, respectively. The generally cylindrical tube 35 contains a segment 43 of lesser diameter, having a flanged end 44 thereon. The flanged end 44 has a bevel 45 thereon which increases in diameter conically toward the body 46 of the tube 35. This design permits a retainer band 47 to be popped over the beveled flange, for example, with a force of 20 pounds or more, to positively retain the fittings 17, 19 within the chamber 41. In the preferred embodiment, each end of each connector tube 35 is structured identically to the end shown in FIGS. 5 and 6.

Figure 8:
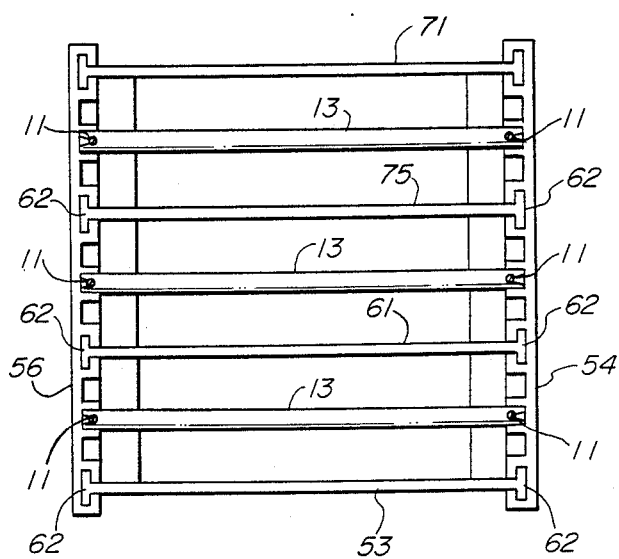
FIG. 8 is a partial cross-sectional view taken at 8—8 of FIG. 7.
Figure 7:
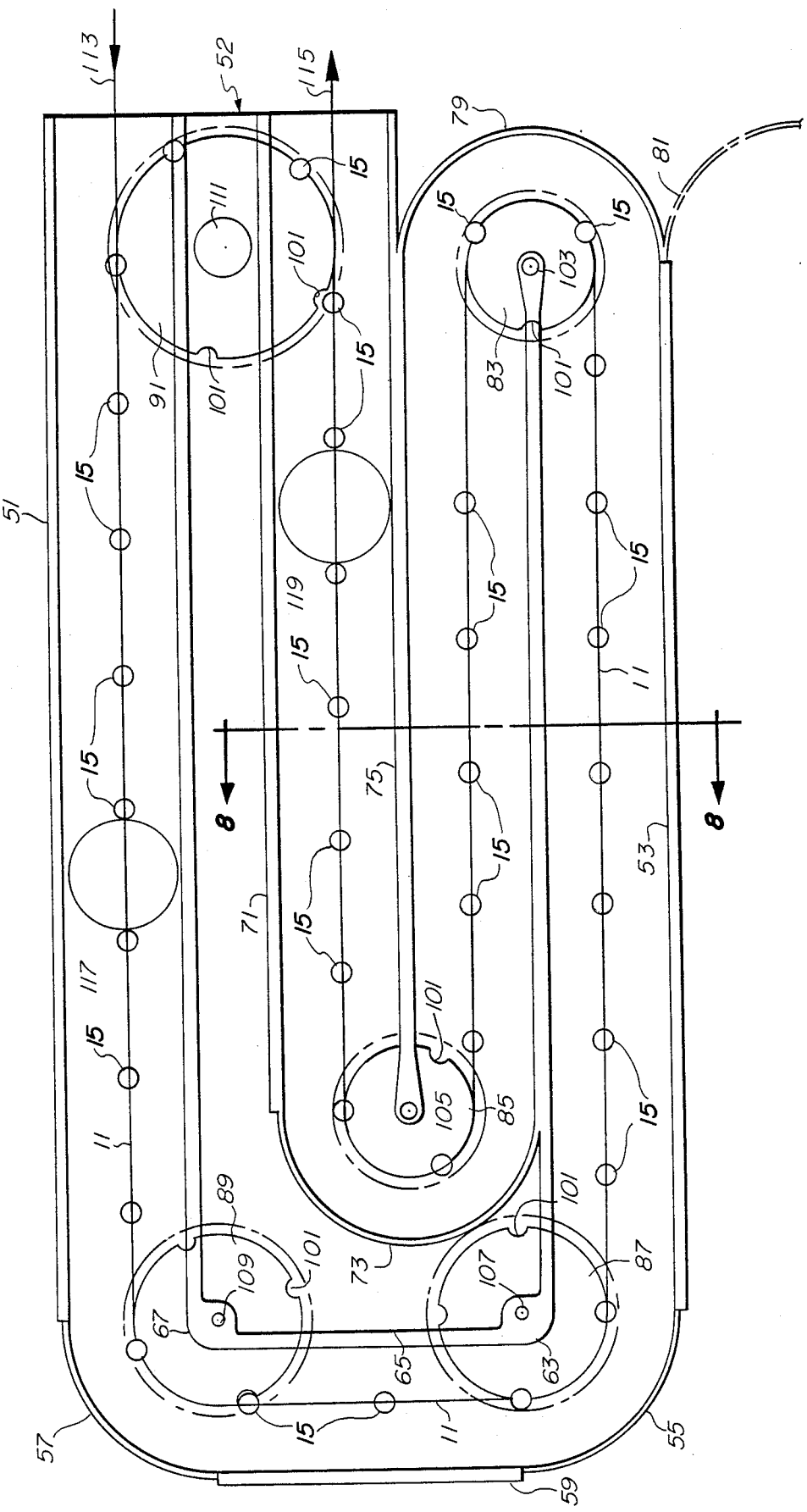
FIG. 7 is a side plan view illustrating an ammunition container employing the preferred embodiment.

An ammunition container employing the preferred wire rope apparatus is shown in FIGS. 7 and 8. FIG. 7 shows a side view of the container with one of two side plates 54, 56 (FIG. 8) removed, and with the tubes 13, 35 not shown for simplicity of illustration. Positioning of the tubes 13 is illustrated in the sectional view of FIG. 8.

The side panels 54, 56 shown in FIG. 6 are preferably one-piece plastic composite members with preformed guides for interlockingly receiving end portions 62 of a plurality of guide panels 71, 75, 61, 53. The end portions are T-shaped in cross-section. The guide panels are also preferably formed of a plastic composite material.

As best illustrated in FIG. 7, the container includes a top panel 51 and a bottom panel 53. The top and bottom panels 51, 53 are closed at one end by two curved quarter panels 55, 57 which have a thicker end panel 59 attached between them.

Within the container are mounted a number of guide panels 69, 71, 75, 61, which serve to guide rounds through the interior of the container. Panels 61 and 69 are integrally formed into a U-shaped panel structure including an end panel portion 65. The panel structure is supported by connection of panel 61 around shafts 103, 107 and connection of panel 69 around a shaft 109, the shafts being journalled in the side panels 56, 54. The end of panel 69 opposite shaft 109 is fastened to housing walls 56, 54 in like fashion to panel 71. An open end 52 is provided in the container where bullets are loaded in and ultimately loaded out.

The guide panel 75 is attached to the open end of the container 52 and to a shaft 105 journalled in the side panels 56, 54. The guide panel 71 is also attached to the wall 56, 54 and to a semicircular end panel 73 whose opposite end is connected to the side panel 61. A second semicircular panel 79 connects between the guide panel 75 and the bottom panel 53. As shown in phantom at 81, the serpentine structure shown may be replicated to expand the container size, if desired.

The top and bottom and guide panels 51, 69, 71, 75, 61, 53 are constructed of a strong lightweight material such as aluminum or a plastic composite. The quarter and semicircular panels 55, 57; 73, 79 are of similar material and are shown thinner, about one-half the thickness of the top, bottom, and guide panels, so that they may be readily bent to form as shown.

As further indicated in FIG. 7, the shafts 103, 107, 109, 111, 105 each mount a sprocket 83, 87, 89, 91, 85. The pair of sprockets 83, 85, which provide a 180-degree turnaround of the wire 11, are both of the same diameter, as are the sprockets 87, 89 which each provide a 90-degree turnaround. The sprocket 91, which is the drive sprocket, is the largest of all the sprockets 83, 85, 87, 89, 91.

The size of the sprockets 83, 85, 87, 89, 91 is selected with their driving requirements in mind. The drive sprocket 91 is made large enough to carry five pockets 101 such that two tubes or crossbars 13, 35 are positively retained in the sprocket 91 at all times to distribute the drive load across a minimum of two mechanical elements. The 90-degree turnaround sprockets 87, 89 each have four pockets 101, and the 180-degree sprockets each have three pockets 101 such that at least a single tube 13, 35 is positively retained in a pocket at all times, thus maintaining proper timing of pockets 101 with crossbars 13, 35. Exemplary radii for the respective sprockets are 1.536 inches for the drive sprocket 91, 1.228 inches for the 90-degree sprockets 87, 89, and 0.921 inch for the 180-degree sprockets 83, 85.

Preferably, side plates 56, 54 are fitted with guides to guide the ends of the crossbars 13 and prevent undesired drooping of the cable 11. A spring tensioner assembly may also be provided between walls 69, 71 to bias the drive sprocket shaft 111 toward open end 52 and thereby compensate for slack in the cable.

In operation, rounds such as shown at 117 are loaded into the ammunition container along the direction of arrow 113 in FIG. 7. Driving power is applied to the terminal drive shaft 111 by external apparatus to load the rounds into the container until it is full. Loading is preferably done at the place the rounds are manufactured. The rounds are then kept in the container until they are to be loaded into a weapon. At that point, drive is again applied to the terminal drive sprocket 91 via shaft 111 to unload rounds. Rounds such as 119 will thus exit the container in the direction shown by arrow 115 in FIG. 7.

As indicated, the just-disclosed linkless ammunition container can be configured to any convenient size and capacity. By changing the number of runs or bays and overall length, any capacity can be chosen to satisfy a matrix of load/download scenarios with respect to type of aircraft, gun system capacity, etc.

As described above, the preferred embodiment provides an efficient ammunition loading apparatus for ground support or an efficient ammunition feeder apparatus for supplying a gun. Both loading and feeding are encompassed by the term "transport" as used herein.

Those skilled in the art will appreciate that the just-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. Ammunition transport apparatus comprising:

first and second parallel wire ropes of equal length;

a plurality of first interconnection means attached to each said wire rope, each first interconnection means on said first wire rope being disposed opposite a first interconnection means on said second wire rope;

a plurality of tubes;

attachment means located at opposite ends of each said tube for receiving one of said first interconnection means and attaching each of said plurality of tubes to said first and second wire ropes;

each said attachment means comprising:

a central opening means for receiving a said first interconnection means;

a first slot means opening into said central opening means;

a second slot means opening into said central opening means; and said first and second slot means cooperating to pass said wire rope on either side of a said first interconnection means received in said central opening means;

second interconnection means located at each end of each said first and second wire ropes such that a second interconnection means at one end of said first wire rope lies opposite a second interconnection means at one end of said second wire rope and such that a second interconnection means at an opposite end of said first wire rope lies opposite a second interconnection means on an opposite end of said second wire rope; and connector tube means for joining the oppositely disposed second interconnection means at the respective ends of said first wire rope and at the respective ends of said second wire rope.

2. The ammunition transport apparatus of claim 1 wherein each of said first interconnection means comprises a steel ball means swaged to the respective first and second wire ropes.

3. The ammunition transport apparatus of claim 1 wherein each said second interconnection means comprises a substantially hemispherical member.

4. The ammunition transport apparatus of claim 3 wherein said connector tube means comprises:

a tube having first and second ends, each of said first and second ends containing receiving means for receiving first and second said hemispherical members; and retaining means for retaining said first and second hemispherical members in said receiving means.

5. The ammunition transport apparatus of claim 1 further comprising:

a plurality of said first and second wire ropes forming a continuous ladder belt; and container means for mounting said ladder belt to move endlessly therein.

6. The ammunition transport apparatus of claim 5 wherein said container means includes means for mounting said ladder belt to move in serpentine fashion.

7. Ammunition transport apparatus comprising:

first and second parallel wire ropes of equal length;

a plurality of first interconnection means attached to each said wire rope, each first interconnection means on said first wire roe being disposed opposite a first interconnection means on said second wire rope;

a plurality of carrier elements having first and second tubular ends;

attachment means in each said tubular end for receiving one of said first interconnection means and attaching each of said plurality of carrier elements to said first and second wire ropes;

each said attachment means comprising:

a central opening means for receiving a said first interconnection means;

a first slot means opening into said central opening means;

a second slot means opening into said central opening means;

said first and second slot means cooperating to pass said wire rope on either side of a said first interconnection means received in said central opening means;

second interconnection means located at each end of each said first and second wire ropes such that a second interconnection means at one end of said first wire rope lies opposite a second interconnection means at one end of said second wire rope and such that a second interconnection means at an opposite end of said first wire rope lies opposite a second interconnection means on an opposite end of said second wire rope; and a connector means including first and second tubular ends for joining oppositely disposed second interconnection means at the respective ends of said first wire rope and at the respective ends of said second wire rope.

8. The ammunition transport apparatus of claim 7 wherein each of said first interconnection means comprises a steel ball means swaged to the respective first and second wire ropes.

9. The ammunition transport apparatus of claim 7 wherein each said second interconnection means comprises a substantially hemispherical member.

10. The ammunition transport apparatus of claim 9 wherein said connector tube means comprises:

receiving means in each of said first and second tubular ends for receiving first and second said hemispherical members; and retaining means for retaining said first and second hemispherical members in said receiving means.

11. The ammunition transport apparatus of claim 7 further comprising:

a plurality of said first and second wire ropes forming a continuous ladder belt; and container means for mounting said ladder belt to move endlessly therein.

12. The ammunition transport apparatus of claim 11 wherein said container means includes means for mounting said ladder belt to move in serpentine fashion.

* * * * *

UNITED STATES PATENT AND TRADEMARK OFFICE
CERTIFICATE OF CORRECTION

PATENT NO.  : 4,941,393

DATED       : July 17, 1990

INVENTOR(S) : Richard E. Dodd, et al

It is certified that error appears in the above-identified patent and that said Letters Patent is hereby corrected as shown below:

Column 1, line 5, delete "F08635-89-0229" and insert therefor --F08635-89-C-0229--.

Column 1, line 43, insert --,-- after A10.
Column 4, line 1, delete "retrict" and insert therefor --restrict--.
Column 4, line 27, delete "conveyer" and insert therefor --conveyor--.
Column 8, line 4, delete "roe" and insert therfor --rope--.

Signed and Sealed this

Seventeenth Day of March, 1992

Attest:

HARRY F. MANBECK, JR.

*Attesting Officer*      *Commissioner of Patents and Trademarks*